United States Patent
Morgan et al.

(10) Patent No.: US 9,369,856 B2
(45) Date of Patent: Jun. 14, 2016

(54) SERVICE OF AN EMERGENCY EVENT BASED ON PROXIMITY

(75) Inventors: Dennis M. Morgan, Pine Grove, CA (US); Alan D. Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,284

(22) PCT Filed: Mar. 31, 2012

(86) PCT No.: PCT/US2012/031748
§ 371 (c)(1),
(2), (4) Date: Oct. 6, 2014

(87) PCT Pub. No.: WO2013/147903
PCT Pub. Date: Oct. 3, 2013

(65) Prior Publication Data
US 2015/0024702 A1    Jan. 22, 2015

(51) Int. Cl.
*H04W 4/00* (2009.01)
*H04W 4/22* (2009.01)
*H04W 4/02* (2009.01)
*H04W 4/04* (2009.01)
*H04M 11/04* (2006.01)

(52) U.S. Cl.
CPC ............... *H04W 4/22* (2013.01); *H04M 11/04* (2013.01); *H04W 4/023* (2013.01); *H04W 4/046* (2013.01); *H04M 2242/04* (2013.01)

(58) Field of Classification Search
None
See application file for complete search history.

(56) References Cited

U.S. PATENT DOCUMENTS

| 6,363,325 | B1 | 3/2002 | Bates et al. |
| 7,574,195 | B2 | 8/2009 | Krasner et al. |
| 2002/0137489 | A1 | 9/2002 | Dutta et al. |
| 2005/0088318 | A1* | 4/2005 | Liu ........................ G08G 1/161 340/902 |
| 2007/0118395 | A1 | 5/2007 | Haase |
| 2010/0271198 | A1 | 10/2010 | Boling et al. |
| 2010/0279647 | A1 | 11/2010 | Jacobs et al. |
| 2011/0098016 | A1 | 4/2011 | Hatton |
| 2011/0187559 | A1 | 8/2011 | Applebaum |
| 2011/0235627 | A1* | 9/2011 | Wang .................. H04L 63/0428 370/338 |
| 2014/0227991 | A1* | 8/2014 | Breton ................... H04W 4/22 455/404.2 |

FOREIGN PATENT DOCUMENTS

| WO | 2013147903 A1 | 10/2013 |
| WO | 2013147905 A1 | 10/2013 |

OTHER PUBLICATIONS

"In car entertainment," Wikipedia, The Free Encyclopedia, available: [http://en.wikipedia.org/w/index.php?title=In_car_entertainment &oldid=457701186], edited Oct. 27, 2011, 2 pages.

(Continued)

*Primary Examiner* — Diane Mizrahi
(74) *Attorney, Agent, or Firm* — Barnes & Thornburg LLP

(57) ABSTRACT

An apparatus and system for communicating information relating to an emergency event occurring at a non-emergency vehicle to an emergency service includes forwarding emergency event information from the non-emergency vehicle to the emergency service via one or more mobile devices located in proximity to the non-emergency vehicle.

25 Claims, 4 Drawing Sheets

(56) References Cited

OTHER PUBLICATIONS

"Automotive navigation system," Wikipedia, The Free Encyclopedia, available: [http://en.wikipedia.org/w/index.php?title=Automotive_navigation_system&oldid=457353694], edited Oct. 25, 2011, 9 pages.

U.S. Appl. No. 13/997,742, filed Jun. 25, 2013, 38 pages.
International Search Report and Written Opinion received for PCT Application No. PCT/US2012/031748, mailed on Nov. 26, 2012, 10 pages.
"OnStar," Wikipedia, The Free Encyclopedia, available: [http://en.wikipedia.org/w/index.php?title=OnStar&oldid=461637591], edited Nov. 20, 2011, 5 pages.

* cited by examiner

SERVICE OF AN EMERGENCY EVENT BASED ON PROXIMITY

BACKGROUND

Consumer automobiles and other motor vehicles can be equipped with an emergency event reporting service (such as ONSTAR). These services are usually offered as an option and thus require payment of additional purchase and subscription fees. In addition, these services commonly route emergency communications through a centralized operator, who may or may not be located anywhere near the vehicle.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
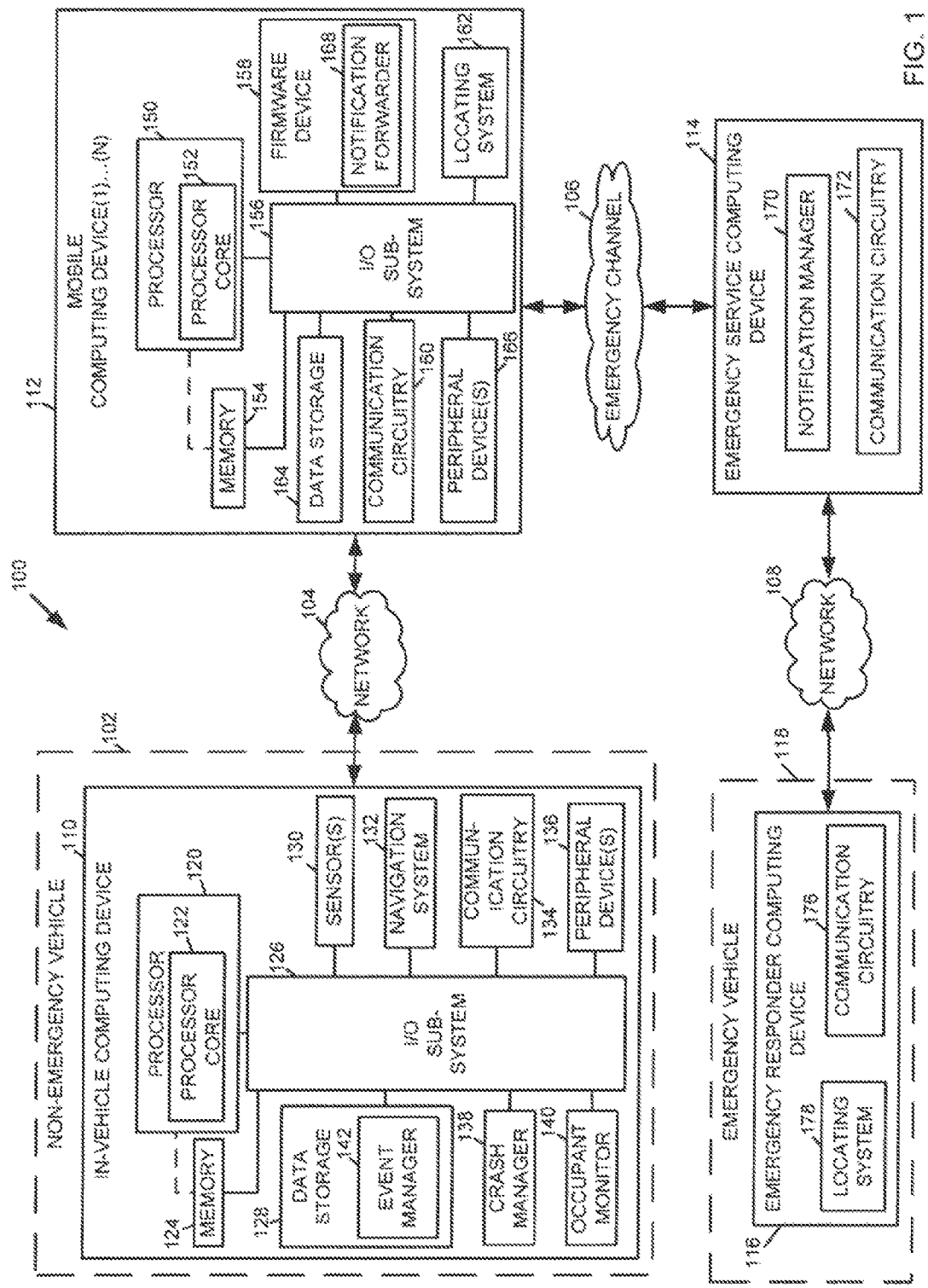
FIG. 1 is a simplified block diagram of at least one embodiment of a system for notifying an emergency service of an emergency event.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, in general, elements depicted with dashed lines are considered optional in at least some embodiments. However, that is not to imply that elements that are not depicted with dashed lines are required in all embodiments. To the contrary, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using machine-level instructions, C, C++, Java, and/or other programming languages.

Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. Also, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, portions of an illustrative system 100 for communicating emergency event information to an emergency responder computing device 116 are embodied in an in-vehicle computing device 110, one or more mobile computing devices 112, and an emergency service computing device 114, which may be in communication with one another via one or more networks 104, 106, 108. An event manager 142 at the in-vehicle computing device 110 generates an emergency notification in response to one or more indicators that a collision, break-in, health-related emergency, or other emergency event has occurred at the in-vehicle computing device 110. Such indicators may include, for example, signals or other inputs generated by one or more sensors 130, a navigation system 132, a crash management system 138, an occupant monitoring system 140, and/or any other on-board vehicle computer system (e.g., an anti-lock braking system, traction control system, in-vehicle information system, and/or others), as explained further below.

The event manager 142 sends the emergency event notification to the network 104 for receipt by one or more of the mobile computing devices 112, using, in some embodiments, a pre-existing wireless communication (or "transport") protocol that is suitable for relatively short- or medium-distance wireless communications. In some embodiments, the mobile computing devices 112 are "unpaired" with respect to the non-emergency vehicle 102, e.g., they are not otherwise in communication with the in-vehicle computing device 110, but they are sufficiently within proximity of the non-emergency vehicle 102 to receive the notification through wireless communication. For mobile computing devices 112 that are in proximity to the non-emergency vehicle 102, the event manager 142 connects or "pairs" them with an emergency channel (e.g., a radio frequency dedicated to emergency communications), so that the mobile communication devices 112 can forward the emergency event notification to the emergency service computing device 114.

A notification forwarder 168 at the one or more mobile computing devices 112 forwards the emergency event notification to the emergency service computing device 114 via the emergency communications channel with which it is paired. In some embodiments, the emergency event notification is configured by the event manager 142 so that its receipt and forwarding by the mobile computing devices 112 occurs with minimal or no disruption to the normal use of the mobile computing device 112. For instance, in some embodiments, the emergency event notification is embodied as a coded message of only a few data packets (or less) in size. At the emergency service computing device 114, a notification manager 170 "decodes" the emergency event notification to obtain therefrom information about the location of the non-emergency vehicle 102. With that information, the notification manager 170 routes the emergency event notification to one or more of the emergency responder computing devices 116 that are in proximity to the non-emergency vehicle 102, so that emergency responders (such as police, fire, ambulance, and/or others) associated with the emergency responder computing devices 116 in proximity to the non-emergency vehicle 102 can respond to the emergency event involving the non-emergency vehicle 102. In this way, emergency communications can be localized to the geographic area that is in proximity to the vehicle that has been involved in an emergency event or at which an emergency event has occurred. In addition, automated emergency notifications may be generated even when vehicle owners do not subscribe to a proprietary emergency service. In addition, since more than one mobile computing device 112 can be used to forward the emergency notifications, the validity and/or reliability of the emergency notifications may be improved.

In the illustrative embodiments, the in-vehicle computing device 110 is associated with a non-emergency vehicle 102 (such as a passenger car or other powered vehicle). In some embodiments, the in-vehicle computing device 110 is embodied as an embedded system of the non-emergency vehicle 102, such as an in-vehicle information or "infotainment" system (IVI) or other in-vehicle computer system. As such, the in-vehicle computing device 110 may be installed in the non-emergency vehicle 102 during manufacture or assembly of the non-emergency vehicle 102, or thereafter (e.g., as an after-market product).

The illustrative in-vehicle computing device 110 is operably coupled to the non-emergency vehicle 102, so that data indicating whether the non-emergency vehicle 102 has or has not experienced an emergency event (such as an impact from or collision with another vehicle or object, flat tire, glass breaking, or sliding off the road, for example) can be received by the event manager 142 of the in-vehicle computing device 110. The data indicating whether the non-emergency vehicle 102 has or has not experienced an emergency event may be obtained via one or more of the sensors 130, which may be embodied as any device or mechanism by which an emergency event occurring at the non-emergency vehicle 102 can be detected. For example, one or more of the sensors 130 may be embodied as a sensor located on or coupled to an exterior surface of the non-emergency vehicle 102 (such as an impact or force sensor on a bumper), a force sensor located in the vehicle cabin (such as a force sensor located in a seat, configured to detect whether the seat is occupied or whether a seatbelt is in use), a pressure sensor located in a vehicle tire, a sensor coupled to a brake or accelerator pedal, an airbag deployment sensor, and/or other sensors normally or customarily installed in the non-emergency vehicle 102. In any event, the sensors 130 provide an indication (e.g. by voltage output or a lack of voltage output, for example) in response to the non-emergency vehicle 102 experiencing an emergency event.

In some embodiments, the data indicating whether the non-emergency vehicle 102 is or is not experiencing an emergency event may be obtained from one or more of the navigation system 132, crash management system 138, occupant monitoring system 140, and/or other vehicle computing systems. For example, in some embodiments, the occupant monitoring system 140 may process the inputs from seat force sensors, determine the number of occupants in the vehicle and/or whether the occupants are wearing seatbelts, and provide the number of occupants and/or seat belt information to the event manager 142. As another example, in some embodiments, the crash management system 138 may process the inputs from exterior impact sensors, determine that a head-on collision has occurred, and provide the nature of the emergency event (e.g., head-on collision) to the event manager 142. As a further example, in some embodiments, the navigation system 132 may determine that the non-emergency vehicle 102 is no longer traveling on a road, or is traveling at a very high or very low rate of speed in a certain direction, and provide such information to the event manager 142. Alternatively or in addition, in some embodiments, user inputs to an in-vehicle computing system (such as pressing the 'hazard' button on the vehicle dash, or health information related to the driver or another vehicle occupant, such as sensor data indicating that the driver may be falling asleep), may be provided to the event manager 142.

The illustrative event manager 142 processes the emergency event information generated by the sensors 130 and/or one or more of the navigation system 132, crash management system 138, occupant monitoring system 140, and/or other in-vehicle computer systems, and generates one or more notifications relating to the emergency event that has occurred. Aspects of the event manager 142 are described in more detail below with reference to FIGS. 2 and 3.

The illustrative in-vehicle computing device 110 includes at least one processor 120 and/or at least one processor core 122, memory 124, an input/output (I/O) subsystem 126, and at least one data storage device 128. In the in-vehicle computing platform context of the illustrative embodiment, the in-vehicle computing device 110 is embodied as an embedded system that is installed in the non-emergency vehicle 102. However, the in-vehicle computing device 110 may be embodied as any suitable type of computing device that can be associated with or connected to a powered vehicle to determine location, emergency event, and/or other information about the non-emergency vehicle 102, and can be connected to a communication network, such as, for example, a smartphone, laptop or tablet computer system, a handheld computing device, or other electronic device, depending on the requirements of a particular design or implementation.

The illustrative processor 120 includes at least one processor core 122. In addition to an amount of cache memory, the processor 120 includes, or is otherwise communicatively coupled to, the memory 124. The memory 124 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

The processor 120 is also communicatively coupled to the I/O subsystem 126. While not specifically shown, the illustrative I/O subsystem 126 may include a memory controller (e.g., a memory controller hub (MCH) or northbridge), an input/output controller (e.g., an input/output controller hub (ICH) or southbridge), and a firmware device. Of course, in other embodiments, I/O subsystems having other configurations may be used. For example, in some embodiments, the I/O subsystem 126 may form a portion of a system-on-a-chip (SoC) and be incorporated, along with the processor 120 and other components of the in-vehicle computing device 110, on a single integrated circuit chip. As such, it will be appreciated that each component of the I/O subsystem 126 may be located on a common integrated circuit chip in some embodiments.

The illustrative I/O subsystem 126 is communicatively coupled to the sensors 130, the navigation system 132, the communication circuitry 134, the data storage device 128, the crash management system 138, and the occupant monitoring system 140. The illustrative navigation system 132, crash management system 138, and/or occupant monitoring system 140 may be integrated into the non-emergency vehicle 102 (e.g., installed in the vehicle dashboard or elsewhere in the vehicle cabin) or may be embodied as a vehicle accessory removable from the non-emergency vehicle 102.

The navigation system 132 is embodied as software or computerized logic and/or instructions that are configured to monitor the geographic location of the non-emergency vehicle 102 (e.g., relative to absolute coordinates such as longitude and latitude), using, for example, a cellular location-based service (LBS) or a global positioning system (GPS). The crash management system 138 is embodied as software or computerized logic and/or instructions that are configured to process data from the various sensors 130 (e.g., external force or impact sensors) and determine therefrom whether the non-emergency vehicle 102 has been involved in an accident. The occupant monitoring system 140 is embodied as software or computerized logic and/or instructions that are configured to process data from various sensors 130 (e.g., internal seat force sensors), determine whether the seats in the non-emergency vehicle are occupied, and take specific actions if a seat is occupied (e.g., issue a reminder to the occupant to put on one's seatbelt).

The communication circuitry 134 may be embodied as one or more devices and/or circuitry configured to enable communications between the in-vehicle computing device 110 and the mobile computing devices 112 via the network 104. The communication circuitry 134 may include one or more wired and/or wireless network interfaces or "cards" to facilitate communications over the wired and/or wireless portions of the network 104.

Portions of the data storage device 128 may be embodied as any suitable device for storing data and/or computer instructions, such as disk storage (e.g. hard disks), a network of physical and/or logical storage devices, and/or others. In the illustrative embodiment, the event manager 142 resides in the data storage device 128. In addition, portions of the navigation system 132, the crash management system 138, and/or the occupant monitoring system 140 may reside in the data storage 128. Portions of the event manager 142, the navigation system 132, the crash management system 138, and/or the occupant monitoring system 140 may be copied to the memory 124 during operation, for faster processing or other reasons.

The I/O subsystem 126 may be communicatively coupled to one or more peripheral device(s) 136 such as a display, touchpad, keypad, microphone, speaker, and/or others, depending upon, for example, the intended use of the in-vehicle computing device 110. Further, it should be appreciated that the in-vehicle computing device 110 may include other components, sub-components, and devices not illustrated in FIG. 1 for clarity of the description.

The illustrative mobile computing device 112 includes at least one processor 150 and/or processor core 152, memory 154, an input/output (I/O) subsystem 156, a firmware device 158, communication circuitry 160, a locating system 162, at least one data storage device 164, and one or more peripheral devices 166. The mobile computing device 112 may be embodied as any suitable type of computing device that can be connected to a communication network; such as, for example, a smartphone, laptop or tablet computer system, a handheld computing device, or other electronic device, depending on the requirements of a particular design or implementation.

The illustrative processor 150 includes at least one processor core 152. In addition to an amount of cache memory, the processor 150 includes, or is otherwise communicatively coupled to, the memory 154. The memory 154 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

The processor 150 is also communicatively coupled to the I/O subsystem 156. While not specifically shown, the illustrative I/O subsystem 156 may include a memory controller (e.g., a memory controller hub (MCH) or northbridge), an input/output controller (e.g., an input/output controller hub (ICH) or southbridge). Of course, in other embodiments, I/O subsystems having other configurations may be used. For example, in some embodiments, the I/O subsystem 156 may form a portion of a system-on-a-chip (SoC) and be incorporated, along with the processor 150 and other components of the mobile computing device 112, on a single integrated circuit chip. As such, it will be appreciated that each component of the I/O subsystem 156 may be located on a common integrated circuit chip in some embodiments.

The illustrative I/O subsystem 156 includes or is communicatively coupled to a firmware device 158 (e.g., flash memory). In the illustrative embodiment, the notification forwarder 168 is embodied in the firmware device 158. The I/O system 156 is also communicatively coupled to communication circuitry 160, a locating system 162, and a data storage device 164. Aspects of the notification forwarder 168 are described in more detail below with reference to FIGS. 2 and 3.

The illustrative communication circuitry 160 of the mobile computing device 112 may be embodied as one or more devices and/or circuitry configured to enable communications between the mobile computing device 112, the in-vehicle computing device 110, and/or the emergency service computing device 114, via the networks 104, 106. The communication circuitry 160 may include one or more wireless network interfaces or "cards" to facilitate communications over the wireless portions of the networks 104, 106, which may include, for example, wireless networks configured according to a Worldwide Interoperability for Microwave Access (e.g., WiMAX) protocol, a Wireless Local Area Network (e.g., WIFI) protocol, a Wireless Personal Area Network protocol (e.g., BLUETOOTH), and/or a Digital Enhanced Cordless Telecommunications (e.g., DECT) protocol.

The illustrative locating system 162 may be embodied as software and/or computerized instructions that are configured to monitor the geographic location of the mobile computing device 112 (e.g., relative to absolute coordinates such as longitude and latitude), using, for example, a cellular location-based service (LBS) or a global positioning system (GPS).

Portions of the data storage device 164 may be embodied as any suitable device for storing data and/or computer instructions, such as disk storage (e.g. hard disks), a network of physical and/or logical storage devices, and/or others. While not specifically shown, it should be appreciated that portions of the notification forwarder 168 and/or the locating system 162 may reside in the data storage device 164, in some embodiments, and may be copied to the memory 154 during operation, for faster processing or other reasons.

The I/O subsystem 156 may be communicatively coupled to one or more peripheral device(s) 166 such as a display, touchpad, keypad, microphone, speaker, and/or others, depending upon, for example, the intended use of the mobile computing device 112. Further, it should be appreciated that the mobile computing device 112 may include other components, sub-components, and devices not illustrated in FIG. 1 for clarity of the description.

Referring further to FIG. 1, the emergency service computing device 114 may be embodied in or as any type of computing device or network of computing devices capable of performing at least the functions described herein as being performable by a computing device associated with an emergency service. For example, all or portions of the emergency service computing device 114 may be embodied in or as a desktop computer, an enterprise computer system, a network of computers, an Internet-enabled hosting service, or other electronic device, system, or combination of any of the foregoing, which is capable of facilitating the communication of emergency event notifications to emergency responders, as described herein.

A notification manager 170 resides at the emergency service computing device 114 and is configured to, via communication circuitry 172; facilitate the routing of emergency event notifications from mobile computing devices 112 to emergency responder computing devices 116 in some embodiments. The notification manager 170 is embodied as software and/or computerized instructions that reside in a data storage device and/or memory of the emergency service computing device 114. Aspects of the notification manager 170 are described in further detail below with reference to FIGS. 2 and 4. While not specifically shown, it should be understood that the illustrative emergency service computing device 114 includes at least one processor, a memory, an input/output (I/O) subsystem, and at least one storage device, and may include one or more peripheral devices, as well as the communication circuitry 172. Generally speaking, such components of the emergency service computing device 114 are similar or analogous to devices with the same name described above.

The illustrative notification manager 170 is configured to route emergency event notifications to emergency responder computing devices 116 via a network 108, which may include one or more emergency channels. In some embodiments, the emergency responder computing device 116 may be embedded in or otherwise associated with an emergency vehicle 118 (such as a police car, fire truck, ambulance, or other emergency responder). The illustrative emergency responder computing device 116 includes communication circuitry 176 and a locating system 178. In general, such components of the emergency service computing device 114 are similar or analogous to devices with the same name described above. For instance, the locating system 178 may keep track of the geographic location of the emergency responder computing device 116, and such information (e.g., latitudinal and longitudinal coordinates) may be transmitted to the notification manager 170 via the communication circuitry 176.

The networks 104, 106, 108 may be embodied as any type of wireless telecommunications network. Portions of the networks 104, 106, 108 may be embodied as or otherwise include one or more public or private cellular networks, telephone, Digital Subscriber Line (DSL) or cable networks, local or wide area networks, publicly available global networks (e.g., the Internet), or any combination thereof. For example, in some embodiments, the networks 104, 106, 108 may be embodied as or otherwise include a Global System for Mobile Communications (GSM) cellular network. Additionally, the networks 104, 106, 108 may include any number of additional devices as needed to facilitate communication between or among the in-vehicle computing device 110, the mobile computing device 112, the emergency service computing device 114, and the emergency responder computing device 116, such as routers, switches, intervening computers and/or others. Any suitable communication protocol (e.g., TCP/IP or WiMAX) may be used to effect communication over the networks 104, 106, 108, depending on, for example, the particular type or configuration of the networks 104, 106, 108. In particular, at least a portion of the networks 106, 108 include an emergency communications channel, e.g., a radio frequency that is dedicated to emergency use or which can be quickly cleared in the event of an emergency. Such channels may be maintained by federal, state, municipal, or local governments, or by private operators, for example.

In general, the components of the in-vehicle computing device 110, the mobile computing device 112, the emergency service computing device 114, and the emergency responder computing device 116 are communicatively coupled as shown in FIG. 1, by one or more signal paths. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like. Also, generally speaking, some of the components of the computing devices described above may be incorporated on a motherboard while other components may be communicatively coupled to the motherboard via, for example, a peripheral port.

Figure 2:
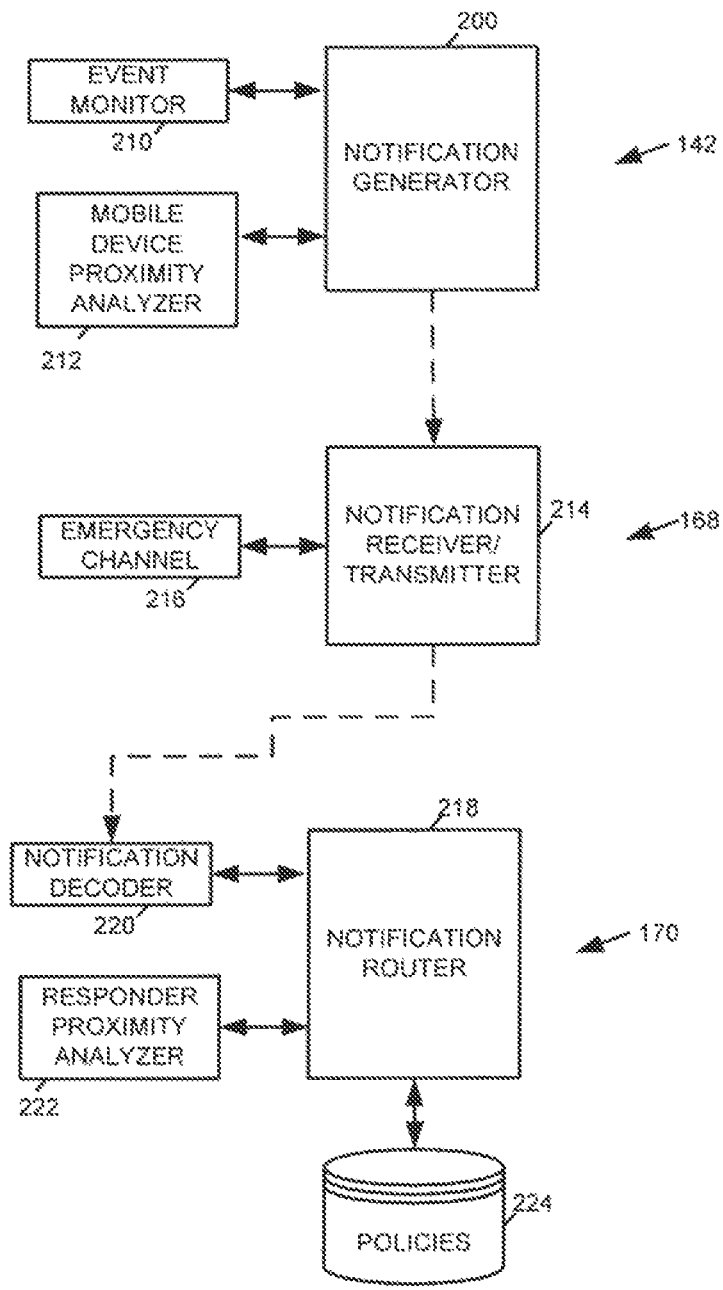
FIG. 2 is a simplified module diagram of at least one embodiment of the system of FIG. 1.

Referring now to FIG. 2, computerized modules of the illustrative event manager 142, notification forwarder 168, and notification manager 170 are shown. Any or all such modules may be implemented in software, hardware, or a combination thereof. Dashed arrows are used to indicate communication of an emergency event notification from the in-vehicle computing device 110 through the mobile computing device(s) 112 to the emergency service computing device 114. The illustrative event manager 142 is embodied as computerized modules (e.g., logic and/or instructions) including a notification generator 200, an event monitor 210, and a mobile device proximity analyzer 212. The illustrative event monitor 210 analyzes indications (e.g., electrical signals or other inputs received from one or more of the sensors 130, the navigation system 132, the crash management system 138, the occupant monitor 140, and/or other in-vehicle computer systems) that the non-emergency vehicle 102 has experienced an emergency event. If the non-emergency vehicle 102 has experienced an emergency event, the event monitor 210 interfaces with the notification generator 200 to prepare an emergency event notification. In the illustrative embodiment, the emergency event notification is embodied as a code or bit string that represents a number of different pieces of data about the non-emergency vehicle 102 and the data and time that the emergency event has occurred. For example, in some embodiments the data encoded in the emergency event notification may include an indicator of the location (e.g., Global Positioning System coordinates), the data and time that the emergency event occurred, the year, make, model, and/or Vehicle Identification Number (VIN) of the non-emergency vehicle, an indicator of the vehicle state (e.g., whether the non-emergency vehicle 102's engine is running or whether the non-emergency vehicle 102 is moving), an indicator of whether any airbags in the vehicle have deployed, an indicator of the number of occupants in the vehicle and/or whether seat belts were in use, and/or other data related to the non-emergency vehicle 102. For instance, each type of data and its current value may be represented by one or more digits/positions in a numeric or alphanumeric string (e.g., as a vector). In any event, the emergency event notification is configured to have a small size (e.g., a few data packets or less), so that it can be processed by mobile computing devices 112 with minimal or no impact on the normal operation of the mobile computing device 112.

The mobile device proximity analyzer 212 uses location-based services or GPS services to locate mobile computing devices 112 that are in proximity to the non-emergency vehicle 102. In some embodiments, the mobile device proximity analyzer 212 analyzes the locations of mobile computing devices 112 and compares those locations to the location of the non-emergency vehicle 102 (as determined based on information generated by the navigation system 132) (e.g., GPS coordinates) or a GPS application running on a mobile computing device 112 located in the non-emergency vehicle 102. However, in some embodiments, the mobile device proximity analyzer 212 simply allows the proximity to be defined by the normal range of the communications transport medium being employed (e.g., WIFI, BLUETOOTH, DECT, and/or others). In response to the occurrence of an emergency event at the non-emergency vehicle 102 and the locating of one or more mobile computing devices 112 in proximity to the non-emergency vehicle 102, the notification generator 200 generates the encoded emergency event notification and sends it to one or more of the mobile computing devices 112 via the network 104.

At the mobile computing devices 112 that receive the emergency event notification, a notification transmitter/receiver 214 of the notification forwarder 168 transmits the emergency notification to the emergency service computing device 114 via an emergency channel 216 of the network 106 as mentioned above. In the illustrative embodiments, the emergency event notification is configured (e.g., small packet size) so that receipt and retransmission by the mobile computing devices 112 is substantially imperceptible to the users of the mobile computing devices 112. In other embodiments, an alert or other type of notification may be issued at the mobile computing device 112 to indicate to the user of the mobile computing device 112 that the device is being used (briefly) to forward emergency event information to an emergency responder. At the emergency service computing device 114, the illustrative notification manager 170 is embodied as computerized modules including a notification decoder 220, a responder proximity analyzer 222, a notification router 218, and a policies database 224.

The illustrative notification decoder 220 analyzes the emergency event notification signal and extracts the information relating to the non-emergency vehicle 102 and the emergency event, described above. The illustrative responder proximity analyzer 222 operates in similar fashion to the mobile device proximity analyzer 212 but to determine (e.g. based on data provided by the locating system 178) which emergency responder computing devices 116 are in proximity to the non-emergency vehicle 102 that has been involved in an emergency event or at which an emergency event has occurred (e.g., by comparing GPS coordinates). The notification router 218 sends the emergency event data decoded by the notification decoder 220 to one or more emergency responder computing devices 116 that are located in a desired proximity to the non-emergency vehicle 102. In the illustrative embodiments, one or more policies 224 may be used to determine an appropriate degree of proximity based on one or more aspects of the notification signal, the non-emergency vehicle 102, the location of the emergency vehicle 118 associated with the emergency responder computing device 116, and/or other factors. For example, if an emergency event involves a non-emergency vehicle 102 that is full of occupants, the proximity may be defined more broadly to allow more emergency responders to respond.

Figure 3:
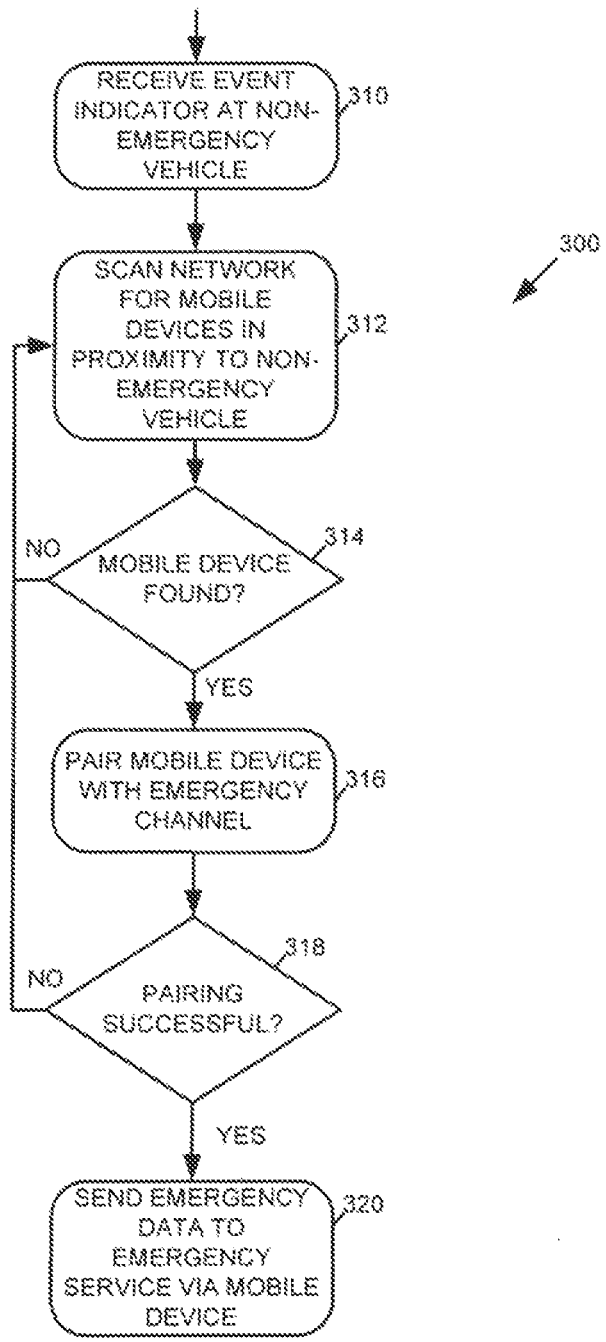
FIG. 3 is a simplified flow diagram of at least one embodiment of a method for handling an indicator of an emergency event at a non-emergency vehicle and forwarding an emergency event notification to an emergency service using one or more mobile computing devices in proximity to the non-emergency vehicle.

Referring now to FIG. 3, an illustrative method 300 executable as computerized logic and/or instructions by the event manager 142 at the in-vehicle computing device 110, for example, is shown. At block 310, the method 300 continuously monitors inputs received by the in-vehicle computing device 110 and determines whether an emergency event has occurred at the non-emergency vehicle 102 (e.g., based on signals received from one or more of the sensors 130, and/or information provided by the navigation system 132, crash management system 138, occupant monitoring system 149, and/or other sources, as described above. In the illustrative embodiment, the monitoring continues until an emergency event occurs or the system is powered off. In response to an indication of an emergency event, at block 312, the method 300 scans the network 104 to identify and/or locate one or more mobile computing devices 112 that are in proximity to the non-emergency vehicle 102. In the illustrative embodiment, the mobile device proximity analyzer 212, described above, is configured to perform the tasks of block 312. As should be understood, the location-related information can be associated with a particular mobile computing device 112 (or a particular in-vehicle computing device 110, for that matter) via a unique device identifier, such as an International Mobile Equipment Identity (IMEI), Vehicle Identification Number (VIN), and/or others.

If the method 300 determines that more than one mobile computing device 112 is in proximity to the non-emergency vehicle 102 at block 314, computerized logic may be executed to select the nearest mobile computing device or devices 112 for communication of the emergency event notification, or to select a mobile computing device or devices 112 based on one or more other factors. As described above, the mobile computing devices 112 in proximity to the non-emergency vehicle 102 may be determined by the transmission range of the wireless communication protocol being used. If no mobile computing devices 112 are found at block 314, the method 300 returns to block 312 and conducts another scan of the network 104. In some embodiments, the method 300 may adjust the parameters for determining proximity before resuming the search for mobile computing devices 112 near the geographic location of the non-emergency vehicle 102.

For mobile computing devices 112 determined or found to be in proximity to the non-emergency vehicle 102, the method 300 attempts to enable communication between the mobile computing device 112 and the emergency service computing device 114 over an emergency channel at block 316. In some embodiments, the method 300 may execute computerized logic to identify one or more emergency communications channels that have been cleared or are otherwise available for communication of the emergency event notification. The method 300 identifies the emergency channel to the firmware device 158, or more specifically, to the notification forwarder 168. If, at block 318, the pairing of a mobile computing device 112 with an emergency channel has completed successfully, the method 300 proceeds to block 320. If the pairing did not complete successfully, the method 300 returns to block 312 and attempts another scan. In some embodiments, the scan of block 312 and/or the pairing of block 316 may be terminated or temporarily suspended after a number of unsuccessful attempts or after a period of time has elapsed, as may be determined according to the requirements of a particular design or implementation of the system 100.

At block 320, the emergency notification generated by the in-vehicle computing device 110 relating to an emergency event occurring at or involving the non-emergency vehicle 102 is transmitted by the paired mobile computing devices 112 to the emergency service computing device 114 via the emergency channel of the network 106.

Figure 4:
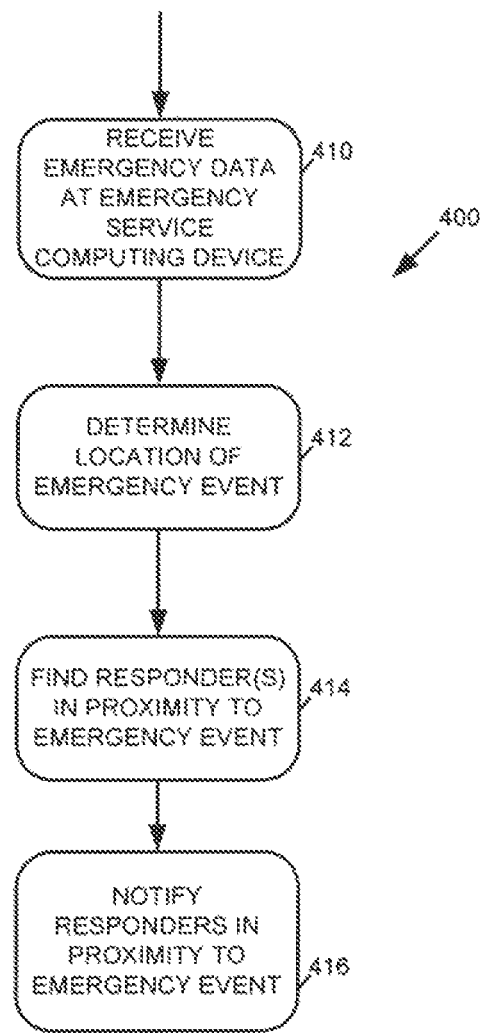
FIG. 4 is a simplified flow diagram of at least one embodiment of a method for routing emergency event data to an emergency responder in proximity to the non-emergency vehicle.

Referring now to FIG. 4, an illustrative method 400 executable as computerized logic and/or instructions by the emergency service computing device 114 is shown. At block 410, the emergency event notification generated by the in-vehicle computing device 110 and forwarded by the mobile computing device(s) 112 is received by the communication circuitry 172 at the emergency service computing device 114. In some embodiments, the emergency service computing device 114 may receive multiple emergency event messages from different in-vehicle computing devices 110. At block 412, location data contained in or derived from the emergency event notification are resolved, using computerized logic, to determine the location of the emergency event, determine whether more than one vehicle is involved in the emergency event, and/or whether multiple emergency events have occurred in close proximity to one another. In some embodiments, triangulation may be applied to the location data to resolve the location of the emergency event or events. As discussed above, in some embodiments, the emergency event notification is decoded or deconstructed using computerized analytical techniques to obtain the data associated with the non-emergency vehicle 102 from which the notification originated and/or other information included in the notification. In some embodiments, the emergency event data obtained from the emergency event notification is analyzed using computerized logic and/or techniques to attempt to determine whether the emergency event notification is a "false alarm" or a true emergency. For example, in some embodiments, a GPS or other geographic mapping software or service may be used to generate a map of the location identified in the emergency event notification. If the map indicates that the location is not a road or other location near where a vehicle can drive (such as a house or office building, for instance), the method 300 may at least preliminarily conclude that the emergency event notification is a false alarm and/or wait for further notifications to verify the occurrence of the emergency event, or may conclude, based on geographic features of the area (such as steep slopes or curvy roads) that the emergency event notification is likely not a false alarm.

At block 414, the method 400 locates or identifies emergency responder computing devices 116 that are in proximity to the geographic location of the emergency event as determined from the emergency event notification at block 412. Any or a combination of the methods discussed above for locating computing devices on a network (e.g., via location-based services, GPS, or transmission range) may be used to find emergency responder computing devices 116. In the illustrative embodiments, the emergency responder computing devices 116 forward geographic location information generated by the locating system 178 to the emergency service computing device 114 for use in determining whether to notify the emergency responder computing device 116 of the emergency event. In addition, as noted above, in some embodiments, policy logic may be applied to the determination of which emergency responder computing devices 116 to notify. For instance, in some embodiments, emergency responder computing devices 116 that are nearest to the geographic location of the non-emergency vehicle 102 involved in an emergency event may be automatically notified, while in other embodiments, certain responders but not others may be notified, based on information contained in or derived from the emergency event notification. For example, if the emergency event notification indicates that a glass break sensor was activated at the non-emergency vehicle 102 but no force or impact sensors were activated, policy logic may conclude that the emergency event likely involves a break-in and not a collision, and notify a police responder first or instead of a fire department. At block 416, the method 400 sends the emergency event information (e.g., location, vehicle identifying information, and, optionally, other pertinent data relating to the emergency event as mentioned above) to the emergency responder computing devices 116 identified at block 414, over an emergency channel of the network 108. It should be understood that the emergency service computing device 114 and the emergency channels described herein, or portions thereof, may be embodied as pre-existing emergency response services and communication channels, or may be designed or developed specifically for use with the system 100.

EXAMPLES

Illustrative examples of the devices, systems, and methods disclosed herein are provided below. An embodiment of the devices, systems, and methods may include any one or more, and any combination of, the examples described below.

In one example, a computing device may be associated with a non-emergency vehicle and may be configured to facilitate communication of an emergency event to an emergency service. In an example, the computing device may include an emergency event manager. In an example, the emergency event manager may be configured to receive, from at least one component of the non-emergency vehicle, an indication that an emergency event has occurred at the non-emergency vehicle; locate at least one mobile computing device in proximity to the non-emergency vehicle; and/or send a notification of the emergency event over a network for receipt by the at least one mobile computing device for transmission by the at least one mobile computing device over an emergency communications channel to at least one emergency responder.

In an example, the emergency event manager may be configured to receive the indication that an emergency event has occurred at the non-emergency vehicle from at least one of a sensor, a crash management system, an occupant monitoring system, and/or a navigation system of the non-emergency vehicle. In an example, the emergency event manager may be configured to use a pre-existing wireless communications protocol to send the notification for receipt by the at least one mobile computing device. In an example, the pre-existing wireless communications protocol may include at least one of a Wireless Local Area Network protocol, a Wireless Personal Area Network protocol, and/or a Digital Enhanced Cordless Telecommunications protocol. In an example, the emergency event manager may be configured to include in the notification an indication of at least one of: the location of the non-emergency vehicle; the date and time of the occurrence of the emergency event; the year, make, and/or model of the non-emergency vehicle; the current operating state of the non-emergency vehicle; the deployment status of at least one airbag located in the non-emergency vehicle; and/or the number of occupants in the non-emergency vehicle. In an example, the emergency event manager may be configured to pair the at least one mobile computing device with an emergency communications channel. In an example, the emergency event manager may be configured to formulate the notification so that receipt and transmission by the at least one mobile computing device is substantially imperceptible by a user of the at least one mobile computing device. In an example, the emergency event manager may determine whether the at least one mobile computing device is in proximity to the non-emergency vehicle based on at least one of: a communication range of at least one wireless communications protocol, location of the mobile computing device relative to the interior of the non-emergency vehicle, and/or location of the mobile computing device relative to the exterior of the non-emergency vehicle. In an example, the emergency event manager may be configured to send the notification to a plurality of mobile computing devices in proximity to the non-emergency vehicle.

In another example, a mobile computing device may be configured to facilitate communication of an emergency event to an emergency responder. The mobile computing device may include an emergency event notification forwarder. The emergency event notification forwarder may be configured to: receive, from a non-emergency vehicle in proximity to the mobile computing device, a notification of an emergency event occurring at the non-emergency vehicle; and may transmit the notification of the emergency event over an emergency communications channel to at least one emergency responder. In an example, the emergency event notification forwarder may be configured to receive and transmit the notification in a manner that is substantially imperceptible by a user of the mobile computing device. In an example, the mobile computing device may be located in the non-emergency vehicle. In an example, the mobile computing device may be located outside the non-emergency vehicle. In an example, the mobile computing device may be, prior to receiving the notification of an emergency event, in communication with an in-vehicle computing system of the non-emergency vehicle. In an example, the mobile computing device may be not otherwise in communication with an in-vehicle computing system of the non-emergency vehicle.

In another example, a system for communicating emergency event notifications to one or more emergency responders may include an emergency service computing device. The emergency service computing device may be configured to: receive, from at least one mobile computing device, a notification that an emergency event has occurred at a non-emergency vehicle in proximity to the at least one mobile computing device; determine, from the notification, the location of the non-emergency vehicle; and send the notification to at least one emergency responder computing device in proximity to the location of the non-emergency vehicle.

In an example, the emergency service computing device may include at least one data storage, at least one processor, and a notification manager embodied in the at least one data storage and executable by the at least one processor, and the notification manager may determine the location of the non-emergency vehicle based on location information included in the notification. In an example, the notification manager may compare the location information relating to the non-emergency vehicle to location information received from the at least one emergency responder computing device. In an example, the notification manager may determine whether an emergency responder is in proximity to the non-emergency vehicle based on at least one of the location, make, year, model, operating status, airbag deployment status, and number of occupants of the non-emergency vehicle, and/or the date and time of the emergency event. In an example, the emergency service computing device may be configured to receive a plurality of emergency event notifications from the at least one mobile computing device and may determine at least one of: whether the emergency event notifications relate to a true emergency event, whether the emergency event notifications relate to multiple emergency events at the same location, and/or whether the emergency event notifications relate to multiple emergency events occurring at different locations in close proximity.

In another example, a method for communicating emergency information from a non-emergency vehicle to an emergency responder may include: receiving, at an in-vehicle computing device of the non-emergency vehicle, an indication that the non-emergency vehicle has experienced an emergency event; locating at least one mobile computing device in proximity to the non-emergency vehicle; pairing the at least one mobile computing device with a pre-existing emergency communications channel; and sending a notification that the non-emergency vehicle has experienced an emergency event to an emergency responder computing device in proximity to the non-emergency vehicle via the at least one mobile computing device. In an example, the method may include receiving the notification at an emergency service computing device and may include decoding the notification to determine the geographic location of the non-emergency vehicle. In an example, the method may include sending information relating to at least one of the location, make, year, or model of the non-emergency vehicle, the operating status of the non-emergency vehicle, the status of airbags deployable by the non-emergency vehicle, and the number of occupants in the non-emergency vehicle to the emergency responder computing device.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. For instance, references herein to "sending notifications," "generating notifications for receipt by," and/or similar language are intended to encompass any suitable communication technique, whether broadcast, direct transmission, or otherwise. In addition, it should be appreciated that the term "mobile computing device" as used herein can refer to computing devices that can be carried by a person as well as computing devices that are otherwise mobile. For example, in-vehicle computer systems may be considered "mobile" insofar as they may be embodied in a mobile apparatus (e.g., a vehicle). Further, while aspects of the present disclosure have been described in the context of an in-vehicle crash notification system, it will be understood that the various aspects have other applications, for example, any application in which it is desired to notify an emergency responder of an emergency event based on the proximity of the emergency responder to the emergency event. Such applications may include, for example, weather- and/or crime-reporting applications.

What is claimed is:

1. A computing device associated with a non-emergency vehicle and configured to facilitate communication of an emergency event to an emergency service, the computing device comprising:
    an emergency event manager configured to:
    receive, from at least one component of the non-emergency vehicle, an indication that an emergency event has occurred at the non-emergency vehicle;
    locate at least one mobile computing device in proximity to the non-emergency vehicle; and
    send a notification of the emergency event over a network for receipt by the at least one mobile computing device for transmission by the at least one mobile computing device over an emergency communications channel to at least one emergency responder.

2. The computing device of claim 1, wherein the emergency event manager is configured to receive the indication that an emergency event has occurred at the non-emergency vehicle from at least one of a sensor, a crash management system, an occupant monitoring system, and a navigation system of the non-emergency vehicle.

3. The computing device of claim 1, wherein the emergency event manager is configured to use a pre-existing wireless communications protocol to send the notification for receipt by the at least one mobile computing device.

4. The computing device of claim 3, wherein the pre-existing wireless communications protocol comprises at least one of a Wireless Local Area Network protocol, a Wireless Personal Area Network protocol, and a Digital Enhanced Cordless Telecommunications protocol.

5. The computing device of claim 1, wherein the emergency event manager is configured to include in the notification an indication of at least one of: the location of the non-emergency vehicle; the date and time of the occurrence of the emergency event; the year, make, and/or model of the non-emergency vehicle; the current operating state of the non-emergency vehicle; the deployment status of at least one airbag located in the non-emergency vehicle; and the number of occupants in the non-emergency vehicle.

6. The computing device of claim 1, wherein the emergency event manager is configured to pair the at least one mobile computing device with a dedicated emergency communications channel in response to receiving the indication that an emergency event has occurred at the non-emergency vehicle.

7. The computing device of claim 1, wherein the emergency event manager determines whether the at least one mobile computing device is in proximity to the non-emergency vehicle based on at least one of: a communication range of at least one wireless communications protocol, location of the mobile computing device relative to the interior of the non-emergency vehicle, and location of the mobile computing device relative to the exterior of the non-emergency vehicle.

8. The computing device of claim 1, wherein the emergency event manager is configured to send the notification to a plurality of mobile computing devices in proximity to the non-emergency vehicle.

9. A mobile computing device configured to facilitate communication of an emergency event to an emergency responder, the mobile computing device comprising:
    an emergency event notification forwarder configured to:
    receive, from a non-emergency vehicle in proximity to the mobile computing device, a notification of an emergency event occurring at the non-emergency vehicle; and
    transmit the notification of the emergency event over an emergency communications channel to at least one emergency responder, wherein the at least one emergency responder comprises at least one of police, fire, or ambulance.

10. The mobile computing device of claim 9, wherein the emergency event notification forwarder is configured to receive and transmit the notification in a manner that is substantially imperceptible by a user of the mobile computing device.

11. The mobile computing device of claim 9, wherein the mobile computing device is located in the non-emergency vehicle.

12. The mobile computing device of claim 11, wherein the mobile computing device is in communication with an in-vehicle computing system of the non-emergency vehicle.

13. The mobile computing device of claim 11, wherein the mobile computing device is not in communication with an in-vehicle computing system of the non-emergency vehicle prior to receiving the notification.

14. A system for communicating emergency event notifications to one or more emergency responders, the system comprising:
    an emergency service computing device configured to:

receive, from at least one mobile computing device, a notification that an emergency event has occurred at a non-emergency vehicle in proximity to the at least one mobile computing device;
determine, from the notification, the location of the non-emergency vehicle; and
send the notification to at least one emergency responder computing device in proximity to the location of the non-emergency vehicle.

15. The system of claim 14, wherein the emergency service computing device comprises at least one data storage, at least one processor, and a notification manager embodied in the at least one data storage and executable by the at least one processor, and the notification manager determines the location of the non-emergency vehicle based on location information included in the notification.

16. The system of claim 15, wherein the notification manager compares the location information relating to the non-emergency vehicle to location information received from the at least one emergency responder computing device.

17. The system of claim 16, wherein the notification manager determines whether an emergency responder is in proximity to the non-emergency vehicle based on at least one of the location, make, year, model, operating status, airbag deployment status, and number of occupants of the non-emergency vehicle, and the date and time of the emergency event.

18. The system of claim 14, wherein the emergency service computing device is configured to receive a plurality of emergency event notifications from the at least one mobile computing device and determine at least one of: whether the emergency event notifications relate to a false alarm, whether the emergency event notifications relate to multiple emergency events at the same location, and whether the emergency event notifications relate to multiple emergency events occurring at different locations in close proximity.

19. The system of claim 18, wherein the emergency service computing device is further configured to (i) determine a first indication that the emergency event notification is a false alarm, (ii) determine a second indication that the emergency event notification is not a false alarm, and (iii) determine that the emergency event notification is not a false alarm based on the first indication and the second indication.

20. The system of claim 19, wherein to determine the first indication comprises to determine that the location of the non-emergency vehicle is not a road, and wherein to determine the second indication comprises to determine the second indication based on geographic features associated with the location of the non-emergency vehicle.

21. One or more machine-readable storage media comprising a plurality of instructions stored thereon that, in response to execution by a computing device, cause the computing device to:
receive, from at least one component of a non-emergency vehicle, an indication that an emergency event has occurred at the non-emergency vehicle;
locate at least one mobile computing device in proximity to the non-emergency vehicle; and
send a notification of the emergency event over a network for receipt by the at least one mobile computing device for transmission by the at least one mobile computing device over an emergency communications channel to at least one emergency responder.

22. The one or more machine-readable storage media of claim 21, wherein to receive the indication comprises to receive an indication that an emergency event has occurred at the non-emergency vehicle from at least one of a sensor, a crash management system, an occupant monitoring system, and a navigation system of the non-emergency vehicle.

23. The one or more machine-readable storage media of claim 21, wherein the plurality of instructions further cause the computing device to include in the notification an indication of at least one of: the location of the non-emergency vehicle; the date and time of the occurrence of the emergency event; the year, make, and/or model of the non-emergency vehicle; the current operating state of the non-emergency vehicle; the deployment status of at least one airbag located in the non-emergency vehicle; and the number of occupants in the non-emergency vehicle.

24. The one or more machine-readable storage media of claim 21, wherein the plurality of instructions further cause the computing device to pair the at least one mobile computing device with an emergency communications channel.

25. The one or more machine-readable storage media of claim 21, wherein to send the notification comprises to send the notification to a plurality of mobile computing devices in proximity to the non-emergency vehicle.

\* \* \* \* \*